(12) United States Patent
Capaccioli et al.

(10) Patent No.: US 12,303,988 B2
(45) Date of Patent: May 20, 2025

(54) MACHINE TOOL COMPRISING A LATERAL CONTACT BODY AND AN ABUTMENT BODY

(71) Applicant: Festool GmbH, Wendlingen (DE)

(72) Inventors: David Capaccioli, Plympton, MA (US); Rüdiger Hölderle, Aichelberg (DE)

(73) Assignee: Festool GmbH, Wendlingen (DE)

( * ) Notice: Subject to any disclaimer, the term of this patent is extended or adjusted under 35 U.S.C. 154(b) by 112 days.

(21) Appl. No.: 17/603,189

(22) PCT Filed: Mar. 26, 2020

(86) PCT No.: PCT/EP2020/058607
§ 371 (c)(1),
(2) Date: Oct. 12, 2021

(87) PCT Pub. No.: WO2020/207818
PCT Pub. Date: Oct. 15, 2020

(65) Prior Publication Data
US 2022/0184719 A1    Jun. 16, 2022

Related U.S. Application Data

(60) Provisional application No. 62/833,369, filed on Apr. 12, 2019.

(51) Int. Cl.
*B23D 47/02* (2006.01)
*B23D 47/04* (2006.01)
*B27B 27/08* (2006.01)

(52) U.S. Cl.
CPC .............. *B23D 47/04* (2013.01); *B27B 27/08* (2013.01); *Y10T 83/7607* (2015.04); *Y10T 83/7697* (2015.04); *Y10T 83/7788* (2015.04)

(58) Field of Classification Search
CPC ...... B23D 47/02; B23D 47/04; B23D 45/044; B21D 28/34; B27B 27/06; B27B 27/08;
(Continued)

(56) References Cited

U.S. PATENT DOCUMENTS 415,940 A * 11/1889 Davis ................... B27G 5/02
83/767
4,283,977 A * 8/1981 Batson ................. B23D 47/04
269/45
(Continued)

FOREIGN PATENT DOCUMENTS

CN          1158775 A    9/1997
CN        102825334 A   12/2012
(Continued)

OTHER PUBLICATIONS

Chinese Office Action of Apr. 18, 2023.
Japanese Office Action dated Feb. 20, 2024.
Japanese Office Action dated Oct. 31, 2023.

*Primary Examiner* — Laura M Lee
(74) *Attorney, Agent, or Firm* — Hoffmann & Baron, LLP

(57) ABSTRACT

A machine tool for machining workpieces, wherein the machine tool includes a machine base for setting down on a ground surface. The machine tool further includes a drive assembly arranged on the machine base with a drive motor and a tool receptacle drivable by the drive motor. machine base has a support surface for supporting the workpiece and includes at least one side contact body with a side contact surface. The side contact body is at an angle to the support surface, and extends along a longitudinal axis. The machine tool further includes at least one abutment body with an abutment surface, which can be fixed opposite the support surface by means of a holding device on the machine tool, (Continued)

so that the workpiece, is supported adjacent to the side contact surface sandwiched between the support surface and the abutment surface.

19 Claims, 4 Drawing Sheets

(58) Field of Classification Search
CPC . B27B 27/10; Y10T 83/7697; Y10T 83/8773; Y10T 83/762
See application file for complete search history.

(56) References Cited

U.S. PATENT DOCUMENTS

| | | | | |
|---|---|---|---|---|
| 4,556,094 | A * | 12/1985 | Willocks | B23Q 3/005 144/1.1 |
| 5,662,019 | A * | 9/1997 | Denman | B27C 1/12 83/438 |
| 5,865,079 | A * | 2/1999 | Itzov | B23D 47/025 83/485 |
| 6,016,732 | A | 1/2000 | Brault et al. | |
| 6,557,601 | B1 * | 5/2003 | Taylor | B27B 27/10 83/435.14 |
| 7,331,264 | B2 | 2/2008 | Ozawa | B23D 59/008 83/490 |
| 7,757,593 | B2 * | 7/2010 | Takase | B27B 27/08 83/471.1 |
| 8,495,939 | B2 * | 7/2013 | Kani | B27B 27/08 83/490 |
| 10,245,750 | B2 * | 4/2019 | Everhart | B27G 5/02 |
| 10,882,123 | B2 * | 1/2021 | Brewster | B27B 5/29 |
| 2004/0154450 | A1 * | 8/2004 | Vallone | B27G 5/02 83/581 |
| 2005/0241450 | A1 * | 11/2005 | Schwartz | B27B 29/00 83/448 |
| 2005/0247177 | A1 * | 11/2005 | Hetcher | B27G 19/02 83/490 |
| 2005/0247178 | A1 | 11/2005 | Hetcher et al. | |
| 2008/0250905 | A1 * | 10/2008 | Khan | E04F 21/0069 269/45 |
| 2009/0071306 | A1 * | 3/2009 | Aoyama | B27B 27/04 83/438 |
| 2009/0133558 | A1 | 5/2009 | Abe | |
| 2009/0235797 | A1 | 9/2009 | Kani et al. | |
| 2012/0032382 | A1 | 2/2012 | Hendrickson et al. | |
| 2012/0167738 | A1 * | 7/2012 | Lawlor | B23D 45/044 83/471.3 |
| 2013/0125726 | A1 | 5/2013 | Chen | |
| 2020/0215623 | A1 * | 7/2020 | Duginske | B27B 27/00 |
| 2021/0078156 | A1 * | 3/2021 | Hölderle | B25H 1/04 |
| 2022/0118641 | A1 * | 4/2022 | Fontana | B27B 27/08 |

FOREIGN PATENT DOCUMENTS

| | | |
|---|---|---|
| CN | 105397185 A | 3/2016 |
| DE | 3820526 C1 | 8/1989 |
| DE | 202011051127 U1 | 11/2011 |
| EP | 1 182 000 A1 | 2/2002 |
| JP | 62-72020 U | 5/1987 |
| JP | 08-039508 A | 2/1996 |
| JP | 2003-62801 A | 3/2003 |
| JP | 2009-72983 A | 4/2009 |
| JP | 2009-126059 A | 6/2009 |
| JP | 2009-255273 A | 11/2009 |
| WO | WO-2008050326 A1 * | 5/2008 ............... B27G 5/02 |
| WO | 2012019005 A1 | 2/2012 |

* cited by examiner

MACHINE TOOL COMPRISING A LATERAL CONTACT BODY AND AN ABUTMENT BODY

This application is a National Stage application based on International Application No. PCT/EP2020/058607, filed Mar. 26, 2020, which claims priority to U.S. Provisional Patent Application Ser. No. 62/833,369, filed Apr. 12, 2019.

BACKGROUND OF THE INVENTION

The invention relates to a machine tool, in particular a semi-stationary or mobile machine tool and/or sawing machine for machining workpieces using a working tool, in particular a separating tool or a sawing tool, wherein the machine tool comprises a machine base for setting down on a ground surface and a drive assembly arranged thereon with a drive motor and a tool receptacle drivable by the drive motor for the working tool, in particular for a separating tool, wherein the machine base comprises a support surface for supporting the workpiece and comprises at least one side contact body with a side contact surface, which is at an angle to the support surface, in particular perpendicular, and extends along a longitudinal axis, and wherein the machine tool comprises at least one abutment body with an abutment surface, which can be fixed opposite the support surface by means of a holding device on the machine tool, so that the workpiece for machining by the working tool, in particular for the production of a crown-moulding cut, is supported adjacent to the side contact surface, e.g. sandwiched, between the support surface and the abutment surface.

Such machine tools in the form of mitre saws are described for example in U.S. Pat. No. 8,020,477 B2 or 8,122,803 B2. The abutment body is arranged in a support position above the support surface of the machine base, so that it supports the workpiece that is to be machined opposite the support surface. Thus, for example, profile strips, which are provided for mounting in room inner corners, rest against the side contact surface and are held in place in an oblique position with respect to the side contact surface and the support surface to perform so-called crown-moulding cuts.

The abutment bodies described in U.S. Pat. No. 8,020,477 B2 are guided, for example, in longitudinal guides on the side stop body or side contact body and support the workpiece to be machined approximately punctiform. So that the workpiece can be optimally supported, two abutment bodies are provided in a longitudinal space with respect to the longitudinal axis.

Although only one abutment body per side contact body is provided in U.S. Pat. No. 8,122,803 B2, it has the advantage over the technology described in U.S. Pat. No. 8,020,477 B2 that its abutment surface extends to some extent along the longitudinal axis, so that the workpiece to be machined is supported over a greater length with respect to the longitudinal axis on the abutment body than in the case of the abutment bodies according to U.S. Pat. No. 8,020,477 B2.

However, the handling of the abutment body or its support of the workpiece to be machined is not optimal in the two concepts discussed.

SUMMARY OF THE INVENTION

It is therefore the object of the present invention to provide an improved support of the workpiece in a machine tool of the type mentioned.

To solve this problem, it is provided that, in a machine tool of the type mentioned, the abutment body can be releasably fixed on the machine base using the holding device, in at least two mutually different longitudinal positions with respect to the longitudinal axis.

The concept according to the invention thus provides that the at least one abutment body or optionally also a plurality of abutment bodies are not arranged stationary relative to the longitudinal axis of the side contact surface but are adjustable. Thus, the abutment body can be brought into an optimal position with respect to the workpiece and/or the working tool. The abutment body can thus be adjusted, for example, towards the flat side of a saw blade or away from it along the linear axis. In particular, when longer or shorter workpieces abut against the side contact surface, the position of the abutment body can be optimally adjusted with respect to the longitudinal axis. Two or more longitudinal positions with respect to the longitudinal axis may be provided for the at least one abutment body, for example a fixed first and a fixed second longitudinal position, but also further longitudinal positions. Furthermore, it is possible that a plurality of abutment bodies is provided, for example two abutment bodies. It is possible that in each case one abutment body is assigned to one side stop surface or that a plurality of abutment bodies and thus several, for example two, abutment surfaces are assigned to one side stop surface.

It is also possible to refer to the abutment body as a hold-down device or hold-down device body which, as it were, holds down the workpiece to be machined in relation to the support surface. The abutment body can also be referred to as an abutment stop body. It is also possible to designate the at least one side contact body as side stop body.

The machine tool is expediently a mobile machine tool but can be used stationary. In particular, it is advantageous if the machine tool is indeed transportable, i.e. has a weight of less than 60-80 kg, but can be put down on a ground surface for sawing or other machining of the workpiece. The workpiece can be supported on the support surface for machining by the working tool and can be placed on the at least one side contact surface, while the separating cut or saw cut or other workpiece machining, for example a drilling or milling operation, is performed. At the same time, at least one abutment surface of the abutment body supports the workpiece with a force direction towards the contact surface.

A preferred embodiment of the invention provides that the machine tool is a table saw, a mitre saw, a slide saw, or a slide compound mitre saw. In particular, it is advantageous if the machine tool is a sawing machine for semi-stationary operation, i.e. that it can for example be taken on construction sites and operated there.

In principle, it is possible that the at least one abutment body, for example, is fixed or fixable or mounted directly on the machine base or the support surface. Thus, the abutment body, for example, can be adjustable with respect to the longitudinal axis independent of the side contact body.

However, a preferred concept provides that the abutment body is arranged or can be arranged on the at least one side contact body.

Thus, for example, the abutment surface is optimally arranged with respect to the side contact surface.

Furthermore, the abutment body can be adjustable, for example, together with the side contact body between the longitudinal positions along the longitudinal axis. Thus, when the side contact body is fixed to the machine base in a different longitudinal position along the longitudinal axis, the longitudinal position of the abutment body simultaneously changes, so that it is positioned particularly favourably relative to the machine base or the support surface.

The abutment body may be arranged stationary on the side contact body. For example, an abutment projection which forms the abutment body can be arranged on the side contact body.

It is preferred if the at least one abutment body is releasably fixed and/or is movably mounted on the respective side contact body by means of a fixing device. The abutment body can therefore be removed, for example, from the side contact body or be mounted on this.

The holding device may be dedicated to fixing the abutment body to the machine base, i.e. that it releasably fixes or supports only the abutment body with respect to the machine base.

However, it is preferred if the holding device is or comprises a holding device for holding the at least one side stop body on the machine base, so that the abutment body is releasably fixable on the machine base in the at least two longitudinal positions with respect to the longitudinal axis by adjusting the side stop body. It is possible that the abutment body is adjustable between the longitudinal positions together with the side stop body. This allows a particularly easy handling. But it is also possible that the side contact body is adjustable between the longitudinal positions without the abutment body mounted thereon and the abutment body is affixed to the side contact body, when the side contact body has taken one of the respective longitudinal positions. In both scenarios, it is possible that, so to speak, by adjusting the side stop body with respect to the machine base along the longitudinal axis, the position of the abutment body is also variable with respect to the longitudinal axis. Thus, for example, if longer workpieces are to be machined, the side stop body may be set at a greater distance from the working tool on the machine base with respect to the longitudinal axis than with shorter workpieces. At the same time, the longitudinal position of the abutment body is variable with respect to the longitudinal axis, so that this is optimally positioned in relation to the longitudinal axis with respect to the shorter workpiece and the longer workpiece, and each can optimally support the workpiece.

The holding device expediently has a base side contact surface, which is aligned with the side contact surface of the side contact body when the side contact body is mounted on the holding device. Thus, for example, the base side contact surface is stationary in front of the support surface. The base side contact surface is extended so to speak by the side contact surface of the side contact body with respect to an axis extending away from the support surface, in operation e.g. a vertical axis.

It is advantageously provided that the holding device comprises clamping means for clamping the at least one side contact body or the least one abutment body with respect to the machine base and/or positive engagement contours for the positive holding of the at least one side contact body or the at least one abutment body with respect to the machine base.

A clamping device allows, for example, the attachment of the abutment body or side contact body in several longitudinal positions with respect to the longitudinal axis, in particular a continuous adjustment of the abutment body with respect to the longitudinal axis. The positive engagement contours comprise, for example, interlocking rear-engaging contours, grooves and groove projections, hooks and hook receptacles on the components to be fastened to one another, for example on the side contact body and the machine base or on the abutment body and the machine base.

For actuation between a fixing position, in which the respective side contact body or abutment body is fixed stationary relative to the support surface, and a release position in which the side contact body or abutment body is movable with respect to the support surface, in particular removable from the support surface, the holding device preferably comprises actuating means, in particular screwing means, one or more levers or the like.

The holding device expediently has a linear guide for a linear adjustment along the longitudinal axis of the at least one side contact body and/or the at least one abutment body. The linear guide comprises, for example, a guide groove in which a guide projection engages. The guide groove and/or the guide projection extend, for example, parallel to the longitudinal axis. It can be provided that at least two guide projections and/or at least two guide grooves are provided, which run along a guide axis, which runs parallel to the longitudinal axis, and have a longitudinal spacing with respect to the guide axis. Thus, a guide projection and/or a guide groove are possible, which are continuous with respect to the guide axis, but also e.g. segmented guide projections or guide grooves are possible.

The side contact surface of the at least one side contact body can comprise an identical vertical extension along the longitudinal axis with respect to a vertical axis which is angled to the longitudinal axis. Thus, the side contact surface can be the same height over the entire length of the side contact body along the longitudinal axis.

However, a preferred concept provides for a larger clearance for the working tool on a section of the side contact body, hereafter designated as a tool section, which is arranged closer to the working tools. Thus, for example, the working tool can be inclined obliquely in an axis transverse to the longitudinal axis of the side contact surface, in particular for making oblique cuts. Thus, it is preferably provided that the side contact surface of the at least one side contact body has a support section and a tool section, wherein the side contact surface protrudes further in front of the support surface in the region of the support section than in the region of the tool section, which is provided for making a larger clearance available for the working tool. The above explanations refer to a state in which the side contact body is fixed to the machine base. For example, the side contact body has different vertical extensions on mutually opposite longitudinal end regions with respect to the longitudinal axis in relation to a vertical axis which is angled to the longitudinal axis. It is possible that the side contact body comprises, for example, a step between its longitudinal ends with respect to the longitudinal axis, and/or an oblique gradient on a side facing away from the support surface or opposite to the support surface, in particular a narrow side.

It is advantageously provided that the at least one abutment body is arranged or can be arranged in the region of the support section and the at least one side contact body is adjustable with respect to the machine base and/or with respect to the longitudinal axis between a first operating position, in which the tool section is arranged closer to the working tool than the support section, and a second operating position, in which the support section is arranged closer to the working tool than the tool section. The first operating position may be, for example, an operating position in which the machine tool is operated without the at least one abutment body, while the second operating position is the one in which the abutment body is arranged on the machine tool.

For example, it is advantageous if the machine tool has at least two side contact bodies, which are arranged or can be arranged on opposite sides of the working tool. If the two side contact bodies can be releasably connected to the machine tool, in particular its machine base, the operator can adjust the side contact body between the first and the second operating position, wherein a side contact body arranged initially left next to the working tool with respect to the longitudinal axis, and a side contact body arranged initially right next to the working tool with respect to the longitudinal axis are interchangeable for taking the first operating position and the second operating position.

A preferred concept provides that each side contact body respectively is releasably affixable on the machine base by means of a holding device, in at least two longitudinal positions with respect to the longitudinal axis. Thus, with each of the side contact bodies, the adjustment of the at least one abutment body associated therewith is realisable along the longitudinal axis.

The at least one abutment body can be adjusted with respect to the support surface between at least two longitudinal positions along the longitudinal axis by means of its associated holding device. A further adjustability of the at least one abutment body between at least two longitudinal positions along the longitudinal axis with respect to the support surface advantageously results from the fixing device, by means of which the at least one abutment body is releasably fastened and/or movably mounted on the respective side contact body. The at least one abutment body can thus be adjustable in two or more longitudinal positions along the longitudinal axis with the aid of the holding device and/or the fixing device with respect to the support surface.

Advantageously, it is provided that the machine tool has at least two side contact bodies. The side contact bodies are advantageously arranged or can be arranged on opposite sides of the working tool. Advantageously, both side contact bodies are adjustable with respect to the machine base, wherein it is possible for one of the side contact bodies to be arranged, for example, stationary relative to the support surface. It is preferred if each side contact body is adjustable towards or away from the working tool.

It is advantageously provided that the abutment surface of the at least one abutment body or the abutment body as a whole is fixable in relation to the support surface by means of a fixing device fixed to a component of the machine tool, which is stationary relative to the support surface, in particular the at least one side contact body, such that it is fixable in at least one vertical distance, preferably at least two mutually different vertical distances, wherein the vertical distance extends along a vertical axis which extends transversely, in particular perpendicular, to the support surface. However, it is also readily possible for the abutment body to be detachably connected or connectable to another component of the machine tool other than the side contact body, for example to the machine base, by means of the fixing device. Thus, for example, an adjustment of the distance or vertical distance between the abutment surface and the support surface is possible, in order to sandwich the workpiece between the two surfaces.

The fixing device comprises, for example, clamping means for clamping the abutment body to the fixed component of the machine tool, screwing means for screwing with the stationary component or screwing the abutment body onto the stationary component or the like. It is also advantageous if the fixing device has positive engagement contours for the positive holding of the abutment body with respect to the stationary component, for example at least one positive locking projection and at least one positive locking receptacle which engage in one another.

An advantageous concept provides that the fixing device has a bearing, in particular a linear bearing and/or a linear guide, for adjusting the at least one abutment body between at least two vertical distances, in particular along an adjustment axis transverse, in particular perpendicular, to the abutment surface, such that in these vertical distances the abutment surface has different distances to the support surface for the workpiece. The bearing may for example be a sliding bearing or linear bearings, but also a pivot bearing or rotary bearing. Combinations of sliding bearings and rotary bearing are readily possible. However, a linear mounting of the abutment body and thus its abutment surface is preferred.

Advantageously, for example, two linear bearings and/or two linear guides are provided, being firstly a linear guide with respect to the longitudinal axis and a linear guide along the adjustment axis, so that the abutment surface is optimally adjustable with respect to the longitudinal position along the longitudinal axis of the side contact surface as well as with respect to the adjustment axis, i.e. the distance between the abutment surface and the support surface of the machine base.

In the case of the aforementioned bearing, in particular the linear bearing or the linear guide, but also in the case of a pivot bearing, it is advantageous if the fixing device comprises a bolt body which passes through a bearing recess, in particular a longitudinal recess, of the bearing. The bolt body may for example simultaneously be part of the clamping means explained below. The bolt body may for example form a bearing axis of a pivot bearing. However, the bolt body can also form a guide body on which the abutment body is guided e.g. linearly guided.

Preferably, the fixing device has a bolt body which forms a part of clamping means for clamping the abutment body to a component of the machine tool, which component is stationary relative to the support surface.

On the bolt body, for example, a control element, in particular a hand wheel, is arranged for gripping by an operator, so that the operator can rotate the bolt body. The bolt body is captively held, for example, on the respective abutment body. Advantageously, the bolt body is rotatably mounted on a rotary bearing receptacle of the abutment body, wherein a wall of the abutment body engages sandwiched between the control element, in particular the handwheel, and the captive securing device.

The bolt body is preferably screwed or can be screwed into a screw receptacle of the component which is stationary with respect to the support surface, for example, in a screw on one or both of the side stop bodies.

It is advantageous if the fixing device has anti-rotation contours, which interlock with one another in positive engagement, for the non-rotatable holding of the abutment surface with respect to the support surface.

A favourable variant provides that the anti-rotation contours comprise or are formed by at least one guide projection of the linear guide, which guide projection extends along the adjustment axis and which engages in a guide receptacle of the linear guide, which guide receptacle extends along the adjustment axis. For example, a guide groove and a guide projection, which engages in the guide groove, are arranged on the side contact body, on which the respective abutment body is arranged, and on the abutment body. It is preferred if the guide groove is arranged on the side stop surface of the side contact body.

At the bottom of the guide groove a screw receptacle is expediently provided for the bolt body.

In general, it should be noted that at least one component of the fixing device is advantageously arranged on the side contact surface of the side contact body, while one other component of the fixing device working in conjunction with this is arranged on the abutment body, which is to be arranged on the side contact body.

The components arranged on the side contact body of the fixing device are preferably not in front of the side contact surface of the side contact body.

It is further expedient if the machine tool has an adjustment device for adjusting the at least one abutment body between a use position, in which the abutment surface for supporting the workpiece is arranged next to the side contact surface and protrudes in front of the side contact surface, and a non-use position in which the abutment surface of the side contact surface is moved away, in particular such that the side contact surface is ready over its entire vertical extension for attaching the workpiece.

In the non-use position, the entire side contact surface of the side contact body is preferably free for attaching the workpiece. For example, the adjustment device comprises a guide for the abutment body, which extends from the side contact surface of the side contact body to its upper side or to a rear side facing away from the side contact surface. Furthermore, the adjustment device may for example also comprise a pivot bearing, with which the abutment body is adjustable toward the side contact surface in the use position and away from the side contact surface in the non-use position. The pivot bearing comprises, for example, a pivot axis which runs parallel to the longitudinal axis of the side contact surface. The abutment body can be pivoted away and/or adjusted away from the use position in the direction of the rest position by means of the adjustment device, for example, away from the side contact surface.

Advantageously, it is provided that the machine base has a pivot base, on which a pivot member is pivotably mounted about a pivot axis for changing a relative position of the tool receptacle for the working tool, for example a separating tool, and a side contact surface provided for attaching a workpiece. The workpiece can be attached to the contact surface, for example laterally or with its lower side.

It is advantageous both in the case of at least one side contact body and in the at least one abutment body if it is for example designed plate-like or is formed by a plate. While the side contact body is advantageously made of metal, for example aluminium, the abutment body is preferably made of plastic. The abutment body and/or the side contact body may be reinforced by a rib structure.

In particular, it is advantageous if the pivot member and/or the pivot base provides a support surface or contact surface for the workpiece. The pivot member or pivot base or both may also provide a support base for the drive assembly. For example, the drive assembly is arranged or held on a carrier which projects upwardly in front of the support surface or contact surface during use of the machine tool.

The drive motor is expediently an electric drive motor.

The drive motor is advantageously provided for rotational driving of the tool receptacle and thus of the separating tool. It is also possible that a transmission between the drive motor and tool receptacle is provided, for example for changing the speed and/or in the form of an angular gear and/or for generating an oscillating movement of the separating tool.

Advantageously, the tool receptacle, in particular the drive assembly as a whole, is pivotable about a mitre pivot axis, by means of a depth pivot bearing or by means of a mitre pivot bearing, towards the support surface for the workpiece and away from the support surface. The depth or mitre pivot axis is preferably horizontal when using the machine tool. The machine tool can then be e.g. be a mitre saw.

An advantageous concept, in particular in an embodiment of the machine tool as a slide saw or as a slide compound mitre saw, provides that the drive assembly is mounted linearly along a longitudinal axis with respect to the pivot base on a linear guide, for performing longitudinal cuts with the separating tool. The linear guide comprises, for example, at least one elongated guide body, in particular a guide bar or a guide rod, which extends along the longitudinal axis. The at least one elongated guide body, in particular the guide bar or the guide rod, can be movable relative to the machine base of the machine tool. For example, a bearing receptacle for the at least one elongated guide body is then provided on a tower-like carrier. It is also possible that the elongated guide body is arranged in a stationary manner on the machine base.

In particular, it is preferred if the drive assembly is mounted to be linearly movable in the manner of a carriage relative to the machine base, in particular on a carrier which projects upwards in front of the machine base. The depth pivot bearing or mitre pivot bearing is expediently provided on the carriage.

It is preferable if the drive assembly is mounted pivotably relative to the machine base by means of an oblique pivot bearing, about an oblique pivot axis perpendicular with respect to the machine base. Thus, for example, mitred cuts or oblique cuts can be made in the workpiece.

A combination of the two aforementioned measures provides that the drive assembly is mounted on the one hand linearly movable and on the other hand obliquely pivotable relative to the machine base. It is advantageous that a carrier for the drive assembly is pivotable about an oblique pivot axis with respect to the machine base by means of the inclined bearing, and the linear guide for the drive assembly is provided on the carrier. For example, the at least one elongated or bar-like guide body protrudes in front of the carrier and in particular extends above a support surface for the workpiece.

BRIEF DESCRIPTION OF THE DRAWINGS

Hereinafter, an exemplary embodiment of the invention will be explained with reference to the drawings. In the drawings:

FIG. 1 shows a perspective oblique view of a machine tool, of which in

DETAILED DESCRIPTION

Figure 1:
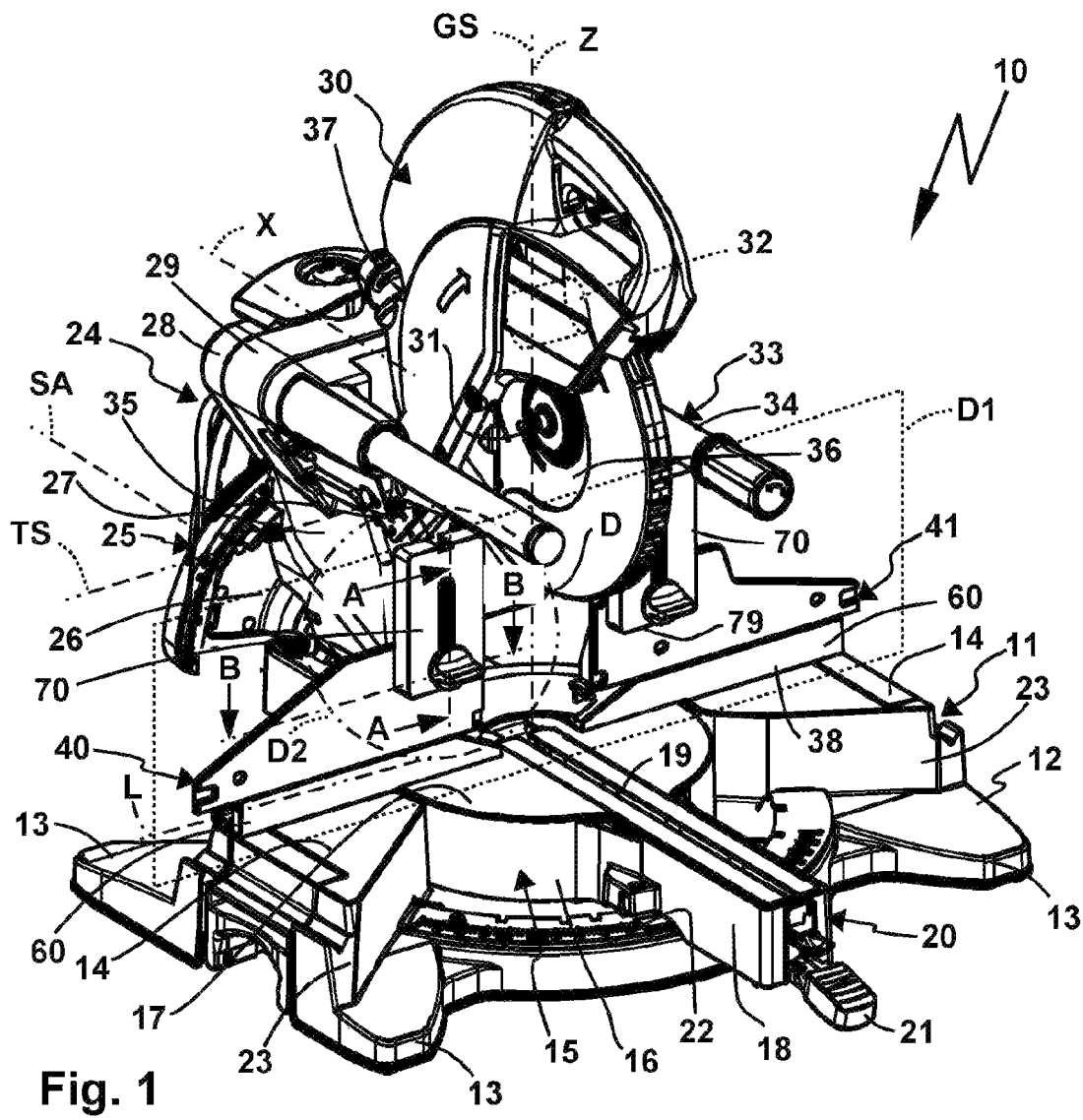
Figure 2:
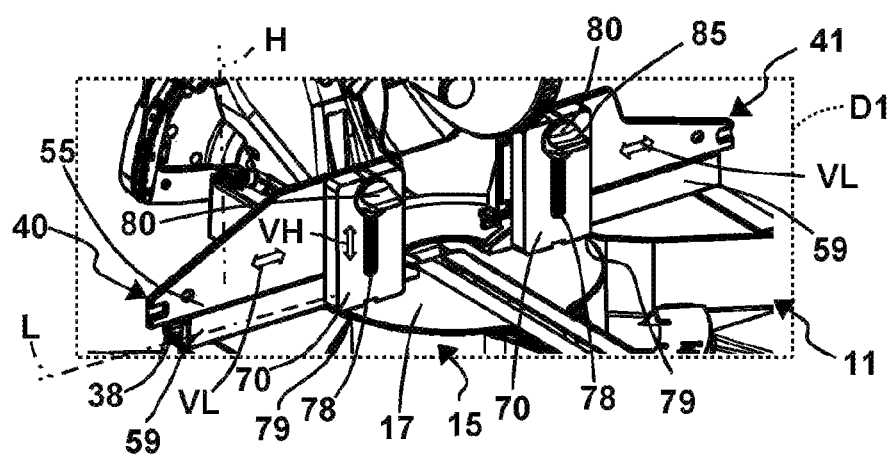
FIG. 2 a detail D1 is shown.

A machine tool 10 comprises a machine base 11 which can be placed on a ground surface. The machine tool 10 is, for example, a sawing machine that is semi-stationary, i.e. it can be taken to a specific usage location. There, the machine tool 10 can be put down on the ground surface and used.

On the machine base 11, a drive assembly 30 is arranged with a drive motor 32 for rotational driving of a tool receptacle 31. The drive motor 32 drives the tool receptacle 31 directly or via a transmission. A working tool 36, for example a separating tool or saw blade, is held on the tool receptacle 31 so that a workpiece W can be machined with the machine tool 10, e.g. cut.

The machine base 11 has a pivot base 12, on which a pivot member 15 is pivotably mounted about a pivot axis GS, which is typically vertical during use. The pivot base 12 has feet 13 for putting down on the ground surface and support sections 23, from which the feet 13 protrude and which comprise support surfaces 14 for placing the workpiece W on their side facing the working tool 36 or drive assembly 30, which in the operating position is their upper side. Between the support sections 23, a receiving space is provided for the pivot member 15, in particular a pivot member base body 16, which is rotatably or pivotably mounted in this receiving space about the pivot axis GS.

The pivot member 15 has a support surface 17 for placing the workpiece W, which is aligned with the support surfaces 14, on its side facing the working tool 36 or the drive assembly 30, which in the operating position is its upper side. Thus, the workpiece W can be placed on the support surfaces 14 and 17 and is supported by them for machining by the working tool 36.

From the pivot member base body 16 protrudes an actuating arm 18 for gripping by an operator, which forms an operating handle for pivotably actuating the pivot member 15 relative to the pivot base 12. On the actuating arm 16 and the support surface 17 extends a slot 19, into which the working tool 36 can plunge.

Furthermore, between the pivot member 15 and the pivot base 12, a pivot fixing device 20 is provided to fix the pivot member 15 with respect to the pivot base 12 in one or more predetermined pivoting positions with respect to the pivot axis GS. The pivot fixing device 20 can be actuated by means of an actuating element 21 between a fixing position and a release position, in which the pivot member 15 is fixed or released with respect to the pivot base 12. To show the respective pivoting position, for example, a scale 22 is provided on the pivot base 12.

A carrier 25 projects from the machine base 11, which in the use position projects up in front of the support surfaces 14, 17.

On the carrier 25, the drive assembly 30, in particular the tool receptacle 31 and thus the working tool 36, is in particular multiaxially pivotably mounted and/or linearly adjustably mounted by means of a bearing device 24, in order to position the working tool 36 relative to the support surfaces 14, 17 and thus relative to the workpiece W positioned thereon, in order to machine the workpiece W.

On the carrier 25, an oblique pivot bearing 26 is provided, by means of which the drive assembly 30 is pivotably mounted about an oblique pivot axis SA. For example, a support arm 27 of the drive assembly 30 is pivotably mounted on the pivot bearing 26 about the oblique pivot axis SA.

The support arm 27 protrudes in front of the carrier 25 and carries a linear guide 33 at its end section 28, which is spaced away from the machine base 11. The linear guide 33 comprises, for example, rod-shaped guide bodies 34, on which a carriage 33 is displaceably mounted along an adjustment axis X. The working tool 36 is arranged between the rod-shaped guide bodies 34. The working tools 36 can be displaced back and forth along the adjustment axis X by means of the linear guide 33. The slot 19 extends parallel to the adjustment axis X.

The adjustment axis X is parallel to the oblique pivot axis SA. The adjustment axis X and the oblique pivot axis SA typically extend horizontally when the machine tool 10 is in use.

The adjustment axis X and the oblique pivot axis SA extend perpendicular to the pivot axis GS.

A drive part 37, comprising the drive motor 32 and the tool receptacle 31, could be arranged stationary on the carriage 29 so that the working tools 36 can only perform a linear movement with respect to the support surfaces 14, 17.

Figure 3:
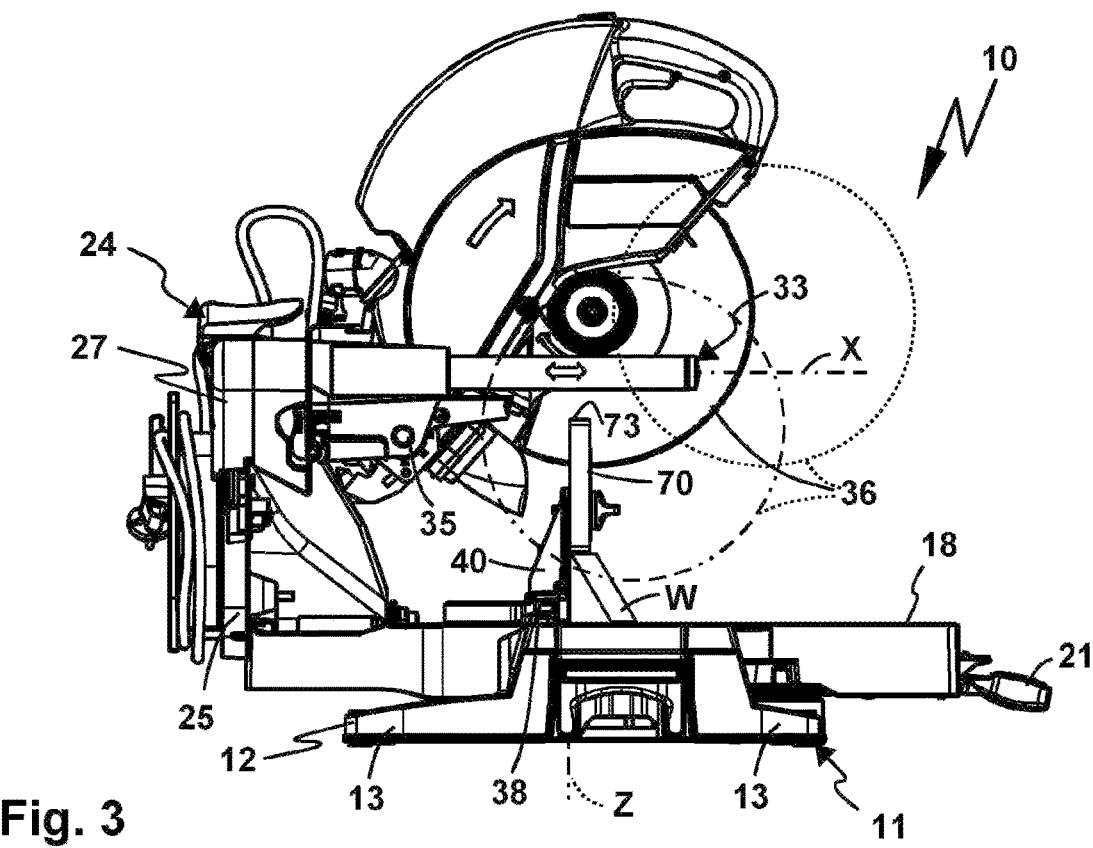
FIG. 3 shows a side view of the machine tool according to the preceding figures.
Figure 4:
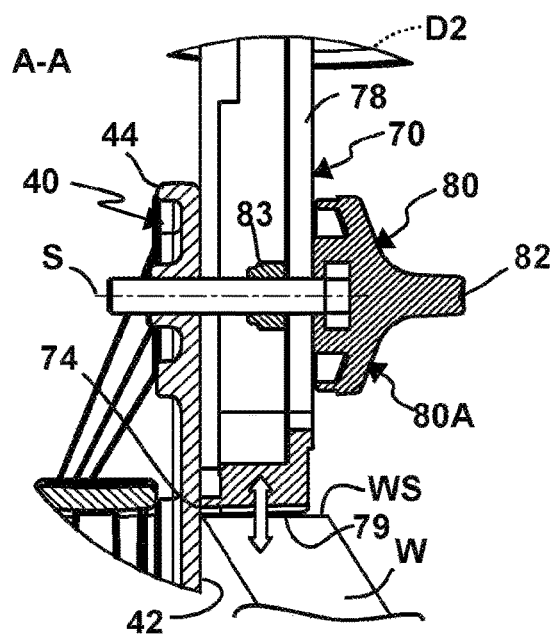
FIG. 4 shows a section through a detail D2 of the machine tool according to FIG. 1, approximately along a section line A-A.
Figure 5:
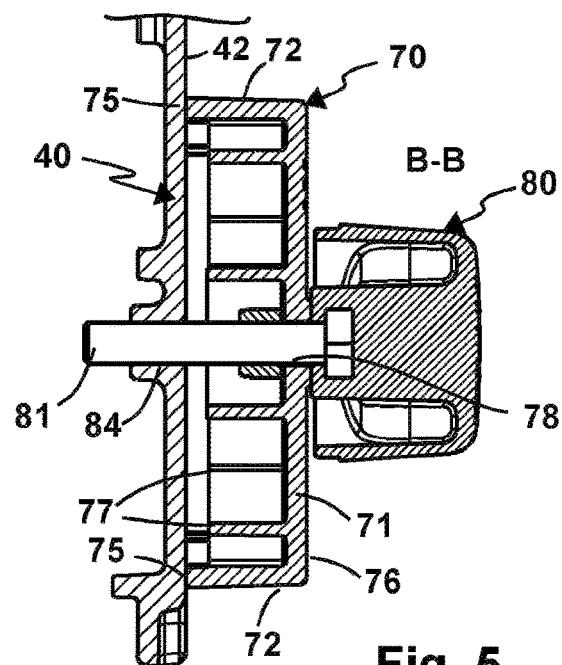
FIG. 5 shows the detail D2, but along a section line B-B in FIG. 1.

However, the drive member 37 is pivotably mounted about a depth adjustment axis TS using a mitre pivot bearing or depth pivot bearing 35, so that the working tool 36 can occupy different depth positions with respect to the support surfaces 14, 17, which are shown in FIG. 3 by dashed lines, in order to accordingly plunge into the workpiece W. For example, the working tools 36 can also plunge into the slot 19.

The depth adjustment axis TS runs perpendicular to the oblique pivot axis SA and/or perpendicular to the adjustment axis X and perpendicular to the pivot axis GS.

With the aid of the bearing device 24, it is therefore possible to introduce separating cuts into the workpiece W in various orientations, for which, however, a firm hold or a firm support of the workpiece W on the machine tool 10 is required. On the one hand, the workpiece W can be supported on the, as it were, central support surface 17, but also on the support surface 14 that extends the support surface 17, so that it is, so to speak, optimally supported from below. On the other hand, further contact surfaces or stop surfaces are provided, which are explained below.

The machine tool 10 has side contact surfaces 42, angled toward the support surfaces 14, 17, in this case perpendicularly, which are provided on side contact bodies 40, 41. Between the side contact bodies 40, 41, the working tool 26 is arranged. The side contact surfaces 42 are aligned with each other and extend along a longitudinal axis L.

The side contact bodies 40, 41 are or comprise, for example, contact plates or side stop plates.

The side contact surfaces 42 have a tool section 43 and a support section 44, wherein the tool section 43 extends with respect to a vertical direction or vertical axis H less far in front of the support surfaces 14, 17 than the support section 44. Thus, therefore, the support section 44 also optimally supports workpieces W, which protrude further in front of these contact surfaces, when in the state of being placed on the support surfaces 14, 17.

The tool section 43, on the other hand, provides a clearance for the working tool 36 when it is pivoted, for example, about the oblique pivot axis SA from its centre position shown in the drawing, so that it has, for example, an inclination of up to 45° or more with respect to the centre position. In the centre position, for example, a cutting surface of the working tool 36 is orthogonal to the support surfaces 14, 17 and orthogonal to the side contact surfaces 42.

The side contact bodies 40, 42 are thus arranged or can be arranged on mutually opposite sides of the working tool 36, wherein in a normal sawing position, which is not shown in the drawing, the tool section[s] 43 are closer to the working tools 36 than the support sections 44, so that a support of the workpiece W away from or at a greater distance to the working tools 36 is optimal. With respect to the vertical axis H, therefore, each of the side contact bodies 40, 41 is lower in a longitudinal end region 45 with respect to the longitudinal axis L than opposite longitudinal end regions 46, where the support sections 44 are provided.

The side contact bodies 40, 41 have a shorter extension at the longitudinal end regions 45 between their upper side 47 and their lower side 50 than at the longitudinal end regions 46. From the longitudinal end region 45 to the longitudinal end region 46, the upper side 47 has, for example, a rising oblique section 48, i.e. the height of the respective side contact body 41, 42 increases from the longitudinal end region 45 in the direction of the support section 44, in particular continuously. In the region of the support section 44, the distance between the upper side 47 and the lower side 50, for example, remains the same, i.e. narrow sides of the side contact body 40, 41 on the lower side 50 and the upper side 47 extend, for example, parallel to each other.

However, a step 48A can also be provided between the tool section 43 and the support section 44.

Holding devices 60 serve for mounting the side contact bodies 40, 41 with respect to the contact surfaces 14, 16 and/or on the machine base 11. The holding devices 60 are fixed to the pivot base 12 of the machine base 11, for example above the support surfaces 14.

The holding devices 60 comprise holding bodies 38, for example profiled bodies. The holding bodies 38 are fixed to the machine base 11 by means of screws 39 or similar attachment means, but could also be integral with the machine base 11.

The holding bodies 38 extend from the support surfaces 40 of the pivot base 12 in the direction of the pivot member 15, so that longitudinal end regions of the holding bodies 38 extend over the supporting surface 17 in the direction of the slot 19. The holding body 38 has a base side contact surface 59 which is aligned with the side contact surfaces 42 of the side contact bodies 40, 41 when they are arranged on the holding bodies 38.

On the lower sides of the side contact bodies 40, 41, on the one hand, a lower side contact surface 51 is provided, which is supported on the holding bodies 38 on their side facing away from the support surfaces 14, 17, in the use position this is their upper sides. Between the projections 57, a guide groove 56 of a linear guide 55 is realised, which constitutes a part of the holding device 60.

In front of the lower side support surface 51 of the side contact bodies 40, 41 guide projections 52, 53 protrude aligning with one another, which can be brought into guiding engagement with the guide groove 56 in order to realise the linear guide 55. In front of the guide projections 52, 53, rear-engaging projections 54 project transversely to the longitudinal axis thereof, which can be brought into rear engagement with projections 57 projecting toward the guide groove 56. Thus, these projections 57 form rear-engaging contours 58 for a rear engagement by the rear-engaging projections 54 of the side contact body 40, 41. The guide projections 52, 53 and the transversely or laterally projecting rear-engaging projections 54, for example, form a T-shaped structure in front view.

Using the linear guides 55, the side contact bodies 40, 41 can be adjusted along the longitudinal axis L, so that, for example, workpieces W projecting further in front of the machine base 11 can be supported on the side contact surfaces 42 at a greater distance from the working plane of the working tool 36. For example, the side contact bodies 40, 41 can be adjusted between longitudinal positions L1 and L2, as well as further longitudinal positions (not shown), along the linear guide 55, in particular continuously.

In the respective longitudinal positions, a fixing of the holding device 60 can be realised using clamping means 61. The clamping means 61 comprise a clamping body 62, which is adjustable using a tension rod 63 or other actuating member, with the help of an actuating lever 64, between a clamping position and a release position or a fixing position and a release position. The clamping body 62 is received in the guide groove 56. The clamping body 62 is preferably plate-like. The clamping body 62 is aligned with the guide projections 52, 53. For example, the clamping body 62 projects with the rear-engaging projections 54 approximately aligning transversely in front of the tension rod 63.

Figure 8:
FIG. 8 shows a section through a detail D3 from the view according to FIG. 7, approximately along a section line C-C in FIG. 7.
Figure 8:
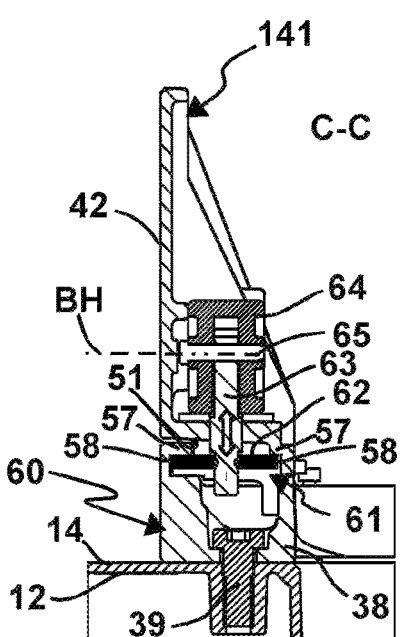

In the clamping position or fixing position, the clamping body 62, which is designed for example in the manner of a sliding block, is positioned in a clamping fit against the projections 57 of the guide groove 56, see FIG. 8. In the release position, however, the clamping fit is unlocked, i.e. the clamping body 62, for example, is arranged at a distance from the projections 57, so that the respective side contact body 40, 41 [is] displaceable along the longitudinal axis L by means of the linear guide 55.

The actuating lever 64 is pivotably mounted about a pivot axis BH by means of an axle element 65 on the respective side contact body 40, 41. The actuating lever 64 has a bearing section which extends around the axle element 65 and has a bearing surface 66 which can be supported on a support surface 67 in a stationary position relative to the respective side contact body 40, 41.

Figure 7:
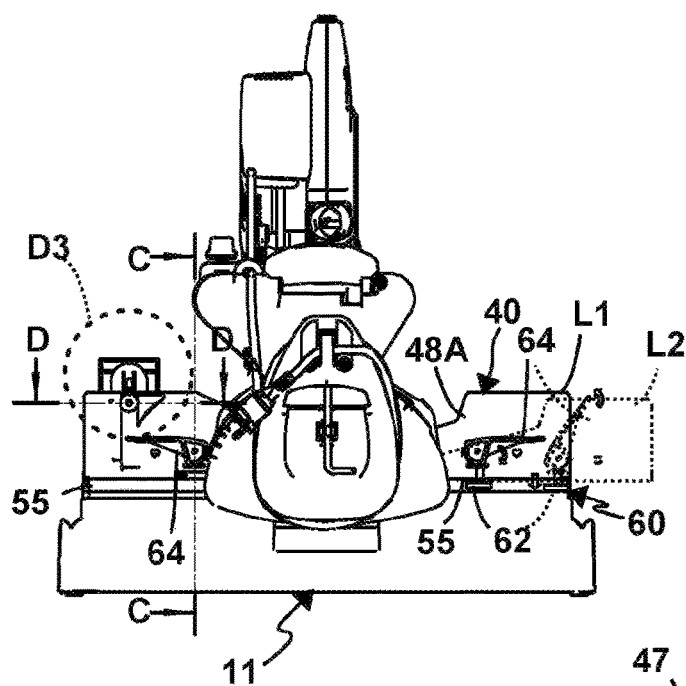
Figure 9:
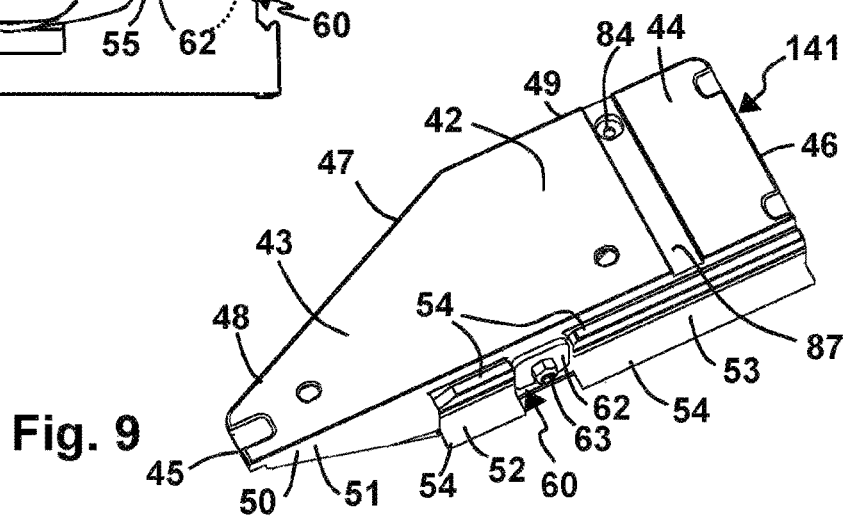
FIG. 9 shows a perspective oblique view of a side stop body of the machine tool according to FIGS. 5-8.
Figure 10:
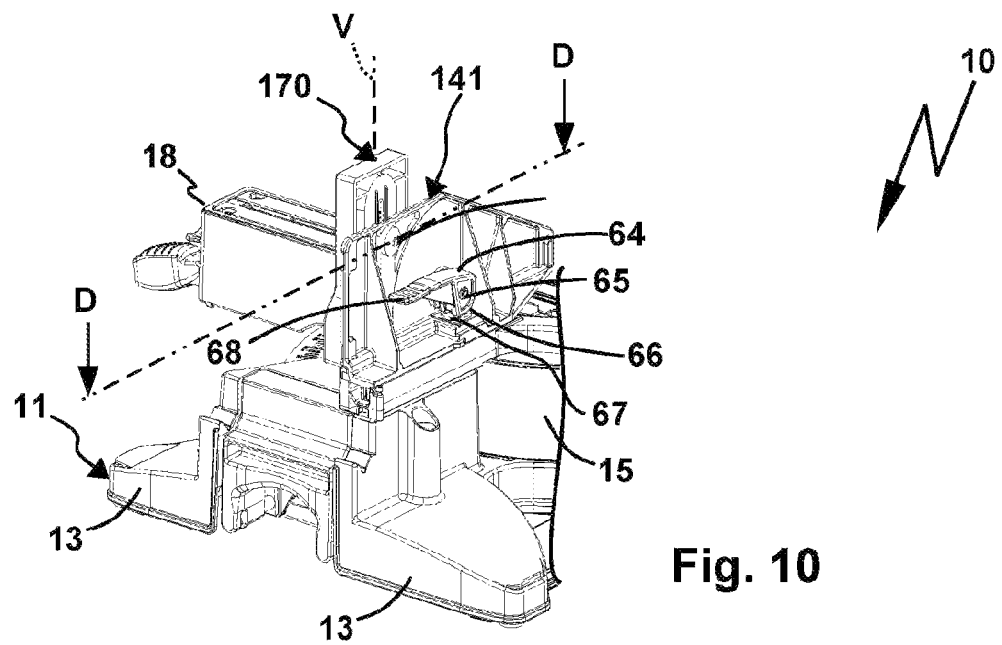
FIG. 10 shows a partial view of the machine tool according to FIG. 5 obliquely from behind.
Figure 11:
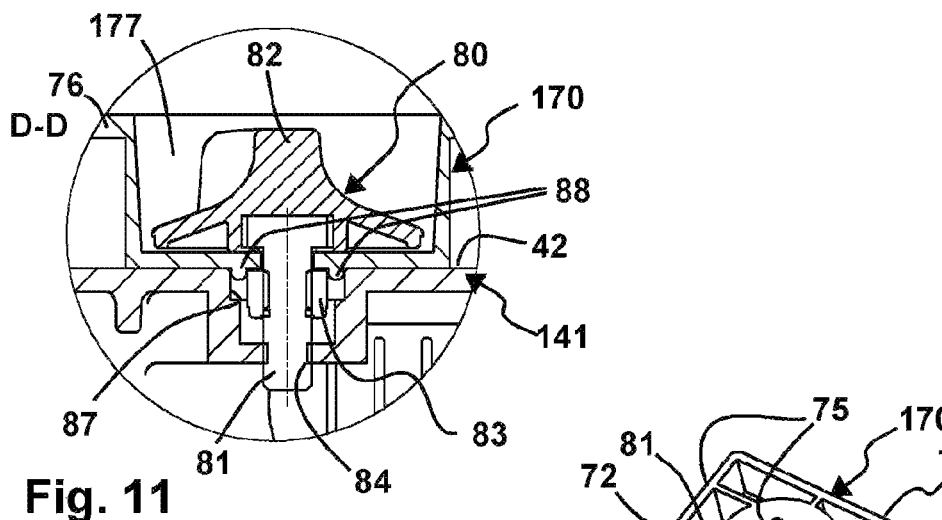
FIG. 11 shows a section through the detail D3 of FIG. 7, approximately along a section line D-D in FIG. 7.
Figure 12:
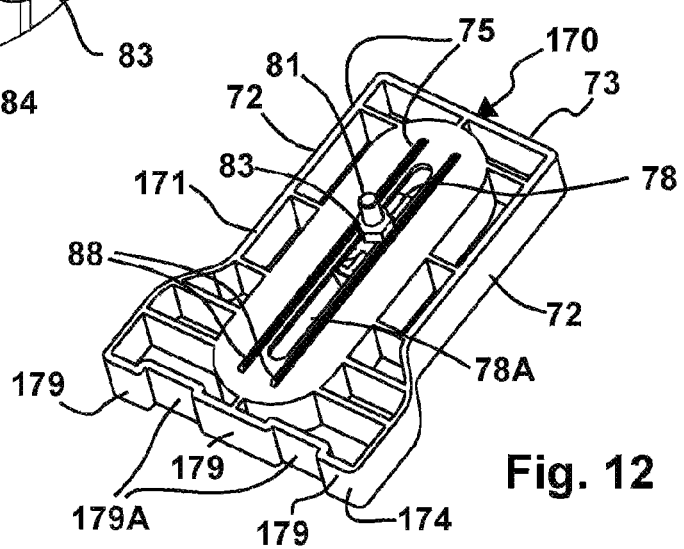
FIG. 12 shows an abutment body of the machine tool according to FIGS. 5-11 in a perspective oblique view of its rear side.

The actuating lever 64 can be adjusted for adjusting the clamping means 61 from the clamping position, in which the actuating lever 64 occupies e.g. the position shown in solid lines in FIG. 7, into a position shown in dashed lines in FIG. 7, in which the bearing surface 66 presses with lesser force on the support surface 67 or is lifted from this, wherein the tension rod 63 can release the clamping body 62 for movement away from the projections 57 or can actively move away from the projections 57. In its position associated with the clamping position (shown in dashed lines in FIG. 7), the actuating lever 64 preferably assumes an over-centre position.

Instead of a respective side contact body 40 or 41, however, it is also possible to use a somewhat modified side contact body, for example a side contact body 141 shown by way of example instead of the side contact body 41. With respect to the holding device 60, the side contact body 141 corresponds to the side contact body 41 and 42. Furthermore, the side contact body 141 is to be understood as an example, i.e. instead of the side contact body 40, a correspondingly geometrically adapted side contact body, which is usable on the left side, could be provided in the manner of the side contact body 141, which, however, is mirror symmetrical to the side support abutment body 141 with respect to the support section 44 and the tool section 43.

In any case it is possible that the side contact bodies 40, 41, 141 either have the support section 44 arranged closer to the working tool 36, as shown in the drawing, or have tool sections 43 arranged closer to the working tool 36, for example when the abutment body 70, 170, explained below, is not needed.

On the side contact bodies 40, 41, 141, the abutment bodies 70, 170 can be releasably fixed, for example by means of a fixing device 80. The side contact bodies 70, 170 have abutment surfaces 79 which lie opposite the support surfaces 14, 17, when the abutment body 70, 170 is in the state of being fixed to the side abutment body 40, 41, 141, so that the workpiece W is held sandwiched between the abutment surfaces 79 and the support surfaces 14, 17, for example in an oblique position according to FIG. 3.

This oblique position is particularly suitable for performing so-called crown moulding saw cuts. The workpiece W is optimally supported with its narrow side WS on the abutment surface 79 and can also be supported on the side contact surface 42.

The abutment bodies 70, 170 have plate bodies 71, 171. While the plate bodies 71 are rectangular in plan view, the plate bodies 171 of the abutment bodies 170 are wider in the region of their abutment surface 79, so that a longer or more generous support of the workpiece W is possible than with the abutment body 70. In the area of the abutment surface 79, the abutment body 170 has, for example, a kind of wider support leg or wider foot section.

The plate bodies 70, 170 have longer narrow side walls 72 which extend between shorter narrow side walls 73, 74, 174. The abutment surfaces 79 are arranged on the narrow side walls 74, 174 of the plate body 71, 171.

In the case of the abutment body 170, recesses 179A are provided in the region of its abutment surface 79.

The plate bodies 71, 171 have a base wall 76 which is reinforced by a rib structure 77, and they extend between the respective narrow side walls 72, 73, 74, 174. The end faces of the narrow side walls 72, 73, 74, 174 which are facing away from the base wall 76, advantageously also end faces of ribs of the rib structure 77, provide support surfaces 75 for support on the side contact surface 42. Consequently, therefore, the respective abutment body 70, 170 can be supported in a planar manner by the side contact surface 42 in the region of the support surfaces 75.

On the base wall 76, a passage opening 78 is provided, in the present case a longitudinal slot, which is penetrated by a bolt body 81 of the fixing device 80.

On the bolt body 81, a handgrip 82 is arranged to be rotated by an operator. While in the case of the abutment body 70 the handgrip 82 protrudes in front of the base wall 76, in the case of the abutment body 170 it plunges down at a recess 177, so that it does not project in front of the base wall 76.

The bolt body 81 is captively held by a securing device 83, such as a disc body, a nut or the like, on the abutment body 70, 170.

The bolt body 81 can be screwed into a screw receptacle 84 on the respective side contact body 40, 41, 141 in order to clamp the abutment body 70, 171 with the side contact body 40, 41, 141. Thus, the fixing device 80 is designed as a clamping device, or the bolt body 81, together with the handgrip 82 supported on the base wall 76, forms a clamping means 80A for clamping the abutment body 70, 171 with the side contact body 40, 41, 141.

When the bolt or bolt body 81 is released, i.e. the clamping means 80A occupy a release position, the respective abutment body 70, 171 can be adjusted along the vertical axis H in the context of an adjusting movement VH, to bring the abutment surface 79 into contact with the workpiece W, in particular its narrow side WS. Thus, therefore, the abutment surface 79 can be adjusted with respect to the workpiece W with the linear adjusting movement VH with respect to the vertical axis H. Crosswise, i.e. in the direction of the longitudinal axis L, an adjusting movement VL is possible by the clamping means 61 being released. Thus, therefore, the abutment surface 79 can be positioned optimally with respect to the workpiece W both with respect to the longitudinal axis L and with respect to the vertical axis H.

Between the abutment body 70, 170 and the side contact body 40, 41, 141, a bearing 85, for example, a linear bearing or sliding bearing and/or a pivot bearing, is provided.

In the case of the abutment body 70, the bearing 85 is to be used for example as a linear bearing, for example, by the abutment body 70 being displaceable along the slot forming a bearing recess 78, which is realised through the passage opening 78. In addition, the bearing 85 can also be used as a pivot bearing, for example not only to use the shorter narrow side walls 73 or 74 as an abutment surface 79, but also to use the longer narrow side walls 72. Specifically, the abutment body 70 is rotatable about the axis of the bolt body 81 when the clamping means 80A are released.

In the case of the abutment body 171, the bearing 85 is realised as a linear bearing with a linear guide 86. The linear guide 86 comprises a guide receptacle 87 on the side contact body 141, for example a guide groove into which at least one guide projection 88, in the present case two guide projections 88, engage, so that the abutment body 171 is linearly adjustable in an axial direction parallel to the vertical axis H along an adjustment axis V with respect to the side contact body 141. The guide projections 88 extend, for example, parallel to the slot-shaped passage opening 78.

A particularly favourable linear guide can be seen in this construction, namely such that the abutment surface 79 of the abutment body 171 is guided exactly parallel to the longitudinal axis L and exactly parallel to the vertical axis H using the linear guides 55, 86.

At the same time, the guide receptacle 87 and the guide projections 88 form anti-rotation contours 89 which prevent the abutment body 171 from rotating relative to the side contact body 141.

Figure 6:
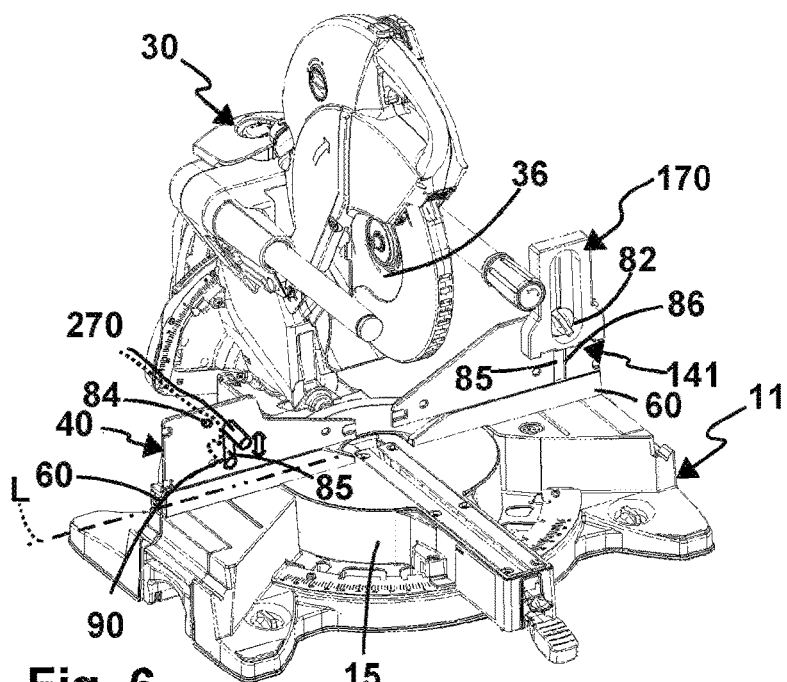
FIG. 6 shows a perspective oblique view of a variant of the machine tool according to the above figures, which in FIG. 7 is shown from behind.

Another embodiment may provide that an abutment body, for example an abutment body 270, is held movably on a side contact body, but is captively held. For example, in the exemplary embodiment according to FIG. 6, the abutment body 270 is arranged mounted on the side contact body along the adjustment axis V, that is to say displaceable in the plane of the side contact surface 42. The abutment body 270 comprises, for example, a support body, which is incorporated in a bearing opening of a bearing 85 on the side contact body 40, displaceable along the adjustment axis V.

It is possible that the abutment body 270 is adjustable between the use position shown in solid lines, in which it protrudes in front of the side contact surface 42, and a non-use position shown in dashed lines, in which it is adjusted away from the side contact surface 42, for example behind this, and thus does not get in the way when not in use. Thus, for example, the bearing 85 at the same time forms an adjustment device 90 for adjusting the abutment body 20 between the non-use position and the use position.

The abutment body 270 may, for example, be fixable in a stationary position on the side contact body 40 with respect to one or more longitudinal positions along the adjustment axis V, using clamping, latching, for example by means of a clamping screw or the like.

It is also readily possible for the abutment body 270 to be arranged in a stationary manner on the side contact surface 42, for example in the position shown in solid lines.

For clamping or for holding an abutment body on a side contact body, clamping can also be provided, for example using the clamping means 61. Thus, for example, a clamping body movably mounted on the abutment body may be provided, which is received in the manner of a sliding block or grooved track in a receiving groove, for example in the manner of the guide groove 56 with its inwardly projecting projections 57 incorporated on the side contact body. The clamping body can be moved into a clamping position or into a release position by an actuating mechanism, for example a screw, an actuating lever in the form of the actuating lever 64 or the like, such that in the clamping position it holds projections engaging behind the receiving groove and clamping these to the abutment bodies in the clamping fit on the side contact bodies, or such that in the release position the clamping body is movable relative to the receiving groove and thus also the abutment body is movable with respect to the side abutment body.

Such a receiving groove may be provided for example on a side contact surface. There, the clamping body is then located in the use position, in which its abutment surface of the support surface is opposite the machine base.

The receiving groove may also extend, for example, on the upper side 47 and expediently over the upper side 47 to the rear side of the respective side contact body, so that the clamping body is guided into the receiving groove and the abutment body can be guided along the path of the receiving groove from the side contact surface to the top and/or back of the side contact body, where it then occupies a non-use position. The clamping body is then designed, for example, as a transverse bolt or rod-shaped clamping body, which can also follow the path of the receiving groove via curved sections or arced sections or angular sections.

10 Machine tool
11 Machine base
12 Pivot base
13 Feet
14 Support surface on 23
15 Pivot member
16 Pivot member base body
17 Support surface
18 Actuation arm
19 Slot
20 Pivot fixing device
21 Actuating element
22 Scale
23 Support sections
24 Bearing device
25 Carrier
26 Oblique pivot bearing SA
27 Support arm
28 End section
29 Carriage
30 Drive assembly
31 Tool receptacle
32 Drive motor
33 Linear guide adjustment axis X
34 Guide body
35 Depth pivot bearing mitre pivot bearing
36 Working tool
37 Drive part
38 Holding body of 60
39 Screw
40 Side contact body left
41 Side contact body right
42 Side contact surface
43 Tool section
44 Support section
45 Longitudinal end region at 43
46 Longitudinal end region at 44
47 Upper side
48 Oblique section stage 48A
49 Straight section
50 Lower side
51 Lower side support surface
52 Guide projection
53 Guide projection
54 Rear grip projection
55 Linear guide
56 Guide groove
57 Projections for rear engagement
58 Rear engagement contours
59 Base side contact surface
60 Holding device
61 Clamping means
62 Clamping body
63 Tension rod
64 Actuating lever pivot axis BH
65 Axis element
66 Bearing surface
67 Support surface
68 Actuation arm
69
70 Abutment body
71 Plate body
72 Longer narrow side wall
73 Shorter narrow side wall
74 Shorter narrow side walls with abutment surface
75 Support surface for 42
77 Rib structure
78 Passage opening/slot
78A Bearing recess
79 Abutment surface recess 179A
80 Fixing device
80A Clamping means
81 Bolt body
82 Handgrip
83 Securing device
84 Screw receptacle on 40/41
85 Bearing/linear bearing
86 Linear guide
87 Guide receptacle
88 Guide projections
89 Anti-rotation contours
90 Adjustment device
V Adjustment axis
VH Adjusting movement vertical axis H
VL Adjusting movement longitudinal axis
W Workpiece
WS Workpiece narrow side
GS Pivot axis
SA Oblique pivot axis
X Adjustment axis
TS Depth adjustment axis L Longitudinal axis
H Vertical axis
L1 L2 Longitudinal positions

The invention claimed is:

1. A machine tool, for machining workpieces using a working tool, wherein the machine tool comprises a machine base for supporting the machine tool and a drive assembly arranged thereon with a drive motor and a tool receptacle drivable by the drive motor for the working tool, wherein the machine base comprises a support surface for supporting the workpiece and comprises at least one side contact body with a side contact surface, which is at an angle to the support surface, and extends along a longitudinal axis, and wherein the machine tool comprises at least one abutment body having a base wall and an abutment surface, the at least one abutment body being movably supported on the at least one side contact body and the at least one side contact body being slidably mounted on a holding device on the machine tool, so that the workpiece for machining by the working tool is supported adjacent to the side contact surface between the support surface and the abutment surface, and wherein the abutment body can be releasably fixed on the machine base using the holding device, in at least two different longitudinal positions with respect to the longitudinal axis, and wherein the abutment surface of the abutment body is an elongated surface extending perpendicular to the base wall in a direction parallel to the longitudinal axis, and wherein the abutment body is slidably mounted on the side contact surface of the at least one side contact body by means of a linear bearing with a linear guide, the linear guide comprising a guide receptacle formed in the side contact surface of the at least one side contact body and at least one guide projection provided on the abutment body, the at least one guide projection provided on the abutment body engaging the guide receptacle formed in the side contact surface for linearly adjusting the abutment body in an axial direction along an adjustment axis with respect to the at least one side contact body, the adjustment axis being angled to the longitudinal axis, and wherein the abutment body is fixable on the side contact surface of the at least one side contact body by means of a fixing device, the fixing device comprising a bolt body and a handgrip disposed at an end of the bolt body, the bolt body extending through the abutment body for engagement with the at least one side contact body and the handgrip protruding outwardly from the base wall of the abutment body, whereby rotation of the handgrip about an axis defined by the bolt body clamps the abutment body against the side contact surface of the at least one side contact body.

2. The machine tool according to claim 1, wherein the holding device is configured for holding the at least one side contact body on the machine base, so that the abutment body is releasably fixable on the machine base in the at least two longitudinal positions with respect to the longitudinal axis by adjusting of the side stop body.

3. The machine tool according to claim 1, wherein the holding device comprises a base side contact surface, which is aligned with the side contact surface of the side contact body when the at least one side contact body is mounted on the holding device.

4. The machine tool according to claim 1, wherein the holding device comprises clamping means for clamping the at least one side contact body or the at least one abutment body with respect to the machine base and/or positive engagement contours for positively holding the at least one side contact body or the at least one abutment body with respect to the machine base.

5. The machine tool according to claim 1, wherein the holding device comprises a linear guide for a linear adjustment along the longitudinal axis of the at least one side contact body and/or the at least one abutment body.

6. The machine tool according to claim 1, wherein the side contact surface of the at least one side contact body comprises a support section and a tool section, wherein the support section of the side contact surface has a height with respect to the support surface greater than a height of the tool section with respect to the support surface, the difference in heights being provided for making a larger clearance available for the working tool.

7. The machine tool according to claim 6, wherein the at least one abutment body is arranged or can be arranged in the region of the support section and the at least one side contact body is adjustable with respect to the machine base and/or with respect to the longitudinal axis between a first operating position, in which the tool section is arranged closer to the working tool than the support section, and a second operating position, in which the support section is arranged closer to the working tool than the tool section.

8. The machine tool according to claim 1, comprising at least two side contact bodies which are arranged on opposite sides of the working tool.

9. The machine tool according to claim 1, wherein each side contact body respectively is releasably affixable on the machine base by means of a holding device, in at least two longitudinal positions with respect to the longitudinal axis.

10. The machine tool according to claim 1, wherein the abutment body is fixable in at least one vertical distance, wherein the vertical distance extends along the adjustment axis which extends transversely to the support surface.

11. The machine tool according to claim 10 wherein the fixing device comprises a bearing for adjusting the at least one abutment body between at least two vertical distances to the abutment surface, such that in these vertical distances the abutment surface has different distances to the support surface for the workpiece.

12. The machine tool according to claim 11, wherein the bolt body passes through a bearing recess of the bearing.

13. The machine tool according to claim 10, wherein the linear guide comprises positively engaging interlocking anti-rotation contours for non-rotatably holding the abutment surface with respect to the support surface.

14. The machine tool according to claim 1, further comprising an adjustment device for adjusting the at least one abutment body between a use position, in which the abutment surface for supporting the workpiece is arranged next to the side contact surface and protrudes in front of the side contact surface, and a non-use position in which the abutment surface is moved away from the side contact surface.

15. The machine tool according to claim 1, wherein the at least one side contact body and/or the at least one abutment body comprises a plate.

16. The machine tool according to claim 1, wherein the machine base comprises a pivot base on which a pivot member is pivotably mounted about a pivot axis for changing a relative position of the tool receptacle for the working tool, and of the side contact surface provided for attaching a workpiece, wherein the pivot member and/or the pivot base provides the support surface for the workpiece and/or provides a support base for the drive assembly and/or the holding device is stationary with respect to the pivot base for the at least one side contact body or is arranged on the pivot base.

17. The machine tool according to claim 1, wherein the drive assembly is linearly mounted with respect to the machine base on a linear guide for performing longitudinal cuts with the working tool, and/or is pivotably mounted about an oblique pivot axis with respect to the machine base and/or by means of a depth pivot bearing or mitre pivot bearing is mounted to pivot toward and away from the workpiece support surface, which is provided for supporting the workpiece.

18. A machine tool for machining workpieces using a working tool, wherein the machine tool comprises a machine base for supporting the machine tool and a drive assembly arranged thereon with a drive motor and a tool receptacle drivable by the drive motor for the working tool, wherein the machine base comprises:
- a support surface for supporting the workpiece;
- a holding device fixed to the support surface;
- at least one side contact body slidably mounted on the holding device whereby the at least one side contact body is slidably movable with respect to the holding device between at least two different longitudinal positions along a longitudinal axis, the at least one side contact body having a side contact surface extending along the longitudinal axis and a guide groove formed in the side contact surface at an angle with respect to the longitudinal axis; and
- at least one abutment body movably supported on the at least one side contact body, the at least one abutment body comprising:
  - an abutment surface for supporting the workpiece for machining by the working tool adjacent to the side contact surface between the support surface and the abutment surface, the abutment surface of the abutment body being an elongated surface extending in a direction parallel to the longitudinal axis;
  - a fixing device for releasably fixing the at least one abutment body to the at least one side contact body; and
  - at least one guide projection engaging the guide groove formed in the side contact surface of the at least one side contact body for linearly adjusting the abutment body in an axial direction along an adjustment axis with respect to the at least one side contact body, the adjustment axis being angled to the longitudinal axis,
wherein the at least one guide projection of the at least one abutment body and the guide groove formed in the side contact surface of the at least one side contact body comprise positively engaging interlocking anti-rotation contours for non-rotatably holding the abutment surface with respect to the support surface, and
wherein the fixing device comprises clamping means with a clamping body, which is adjustable between a clamping position and a release position, the clamping body being movably mounted on the abutment body and being received in the manner of a sliding block or grooved track in a receiving groove on the side contact body, the receiving groove having inwardly projecting projections incorporated on the side contact body, and
wherein the clamping body is movable into the clamping position or into the release position by actuation of an actuating mechanism, such that, in the clamping position, the clamping body engages the inwardly projecting projections of the receiving groove for a clamping fit of the abutment body on the side contact body, and, in the release position, the clamping body is movable relative to the receiving groove and thus the abutment body is movable with respect to the side abutment body, and
wherein the actuating mechanism comprises a screw.

19. The machine tool according to claim 18, wherein the fixing device releasably fixes the at least one abutment body to the at least one side contact body between at least two vertical distances extending along an adjustment axis disposed transversely to the support surface.

* * * * *